No Printed Specification Available
8183X
A. G. Hull,
Truss.
Patented May 7, 1834.
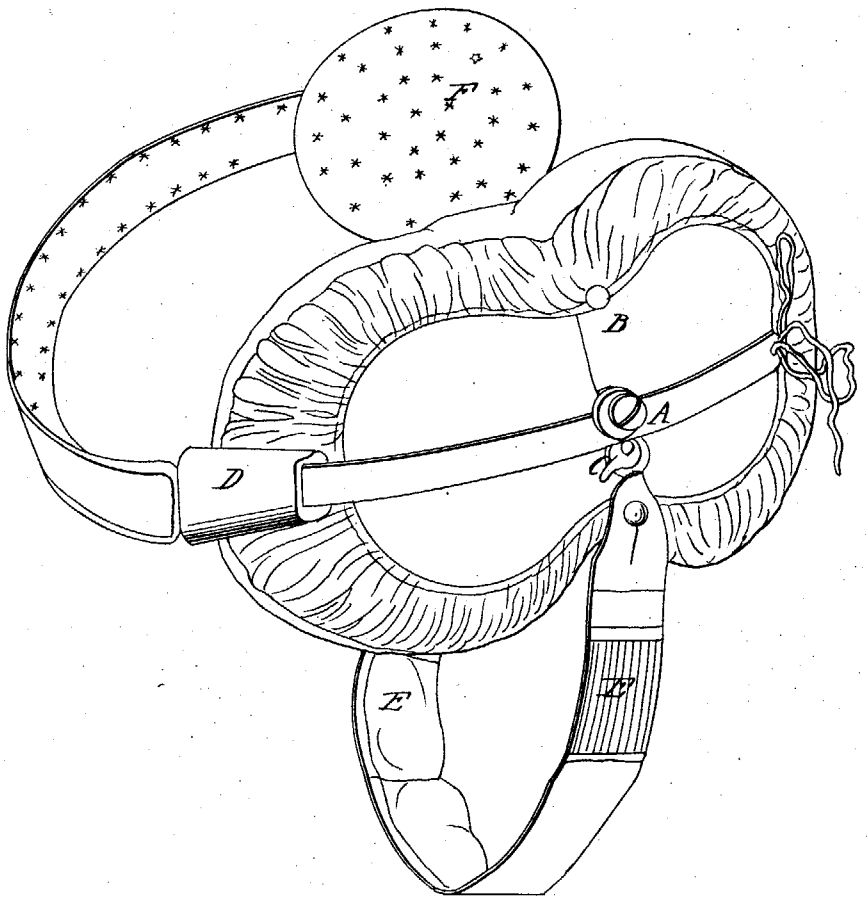
AM. PHOTO-LITHO. CO. N.Y. (OSBORNE'S PROCESS.)

8183X Amos G. Hull.

Patented May 7, 1834.—

Letters Patent.

The Schedule referred to in these Letters Patent and making part of the same, containing a description in the words of the said Amos G. Hull himself of his improvement called, "a surgical apparatus for the relief and cure of procidentia and prolapsus uteri, and other diseases dependent upon the relaxation of the viscera of the pelvis.

The inventor of this apparatus has discovered, and by means thereof has demonstrated, that a prolapsus or falling down of the womb or other organ of the pelvis, can be cured by pressure made upon or against the belly. This is a new fact in surgery—heretofore prolapsus of the womb was treated by introducing an instrument into the vagina or passage leading to the womb and worn there as a merely mechanical prop or block to hold that organ in its place, when the woman was in an erect posture, whereby the disease was only paliated for a short time, whilst the instrument often produces great inconvenience to the patient and generally aggravated and increased the extent of the malady. This apparatus on the contrary instead of acting as a prop or block, has its main pressure above the fallen viscera, and operates as the inventor believes by lifting the peritoneum and the front wall of the belly upwards to elevate the displaced parts to their natural position, whilst by restoring tone to all these parts, as properly directed pressure is known to do in other cases of surgery, it removes the proximate cause of the maladies enumerated.

This apparatus may be said also to take off some part of the immense and constant depressing force which the diaphragm and abdominal muscles exert upon the viscera of the pelvis, and which in many cases, by being morbidly increased constitutes, if not a principal cause, at least one of the most distressing symptoms of the disease— However the operation of this apparatus may be explained by the surgeons, the inventor claims the discovery of the fact, that properly

8183X properly directed pressure made upon or against the lower part of the belly, relieves and often effectually removes falling of the womb, and many other maladies frequently connected therewith.

This apparatus consists of the following parts – a spring like that used in my truss for hernia; two pads, the one for the belly and the other for the back of the patient, a cork wedge to slide between the belly pad and the spring above named. The spring requires no further description. The back pad is made similar to the back pad of my truss for hernia serving principally for a cushion under the posterior end of the spring, and also for the attachment of straps herein after mentioned. The belly pad must be made large enough to cover all that part of the belly lying below the navel, and known in anatomy by the name of Hypogastric region; but it must not be made any larger. The outline form of this pad may be seen in the drawings, annexed to this specification. This pad has the form of a double inclined plane, the hollow or inner aspect of which is directed towards the belly and is called the inner [illegible] surface. the outer surface of the pad is the converse of the inner, and is called the back of the pad. It is necessary that the planes of the inner surface of this pad should be movable so that the pad can always be made to correspond exactly to the various and changing convexities of the abdomen – To effect this important object, the pad consists of two wings of thin metal joined together near the centre of the pad by a hinge fixture. These wings joined as aforesaid form a pad plate which is covered with soft leather or cloth and wadded or stuffed on its inner surface, so as to make a soft cushion for the belly of the patient. The belly pad is attached to the spring by any c[illegible]venient fixture by its back or outer surface at the centre. By means of the cork wedge above named which is slid along the under surface of the spring (upon which it is looped) till it lies upon the back of the smaller wing of the pad, the lesser wing is depressed; and by retracting it along the spring away from the pad the lesser wing elevates itself to contact with the spring; wherefore it is to be seen that the cork wedge acting upon a hinged pad accomplishes the purposed object so necessary in the case, that is, it lessens or increases the capacity or 8183x

[illegible] of the double planed inner surface of the pad, so as to make
[illegible] correspond with perfect exactness to the variable convexity
of the surface of the belly. and besides as the spring is hook shaped,
[illegible] upon the back of the larger wing of the pad and therefore
presses harder upon that wing than it does upon the lesser wing;
the wedge being placed between the lesser wing and the spring im-
parts any quantity of the force of the spring to that wing that may
be required to render the pressure of the spring equal upon
the two wings of the pad, by which means both sides of the
hypogastric regions of the belly are equally pressed by the appa
ratus, a result which is very important to the cure of the
Maladies enumerated. For the full and entire understanding
of the inventors meaning in regard to the construction and operation
of the belly pad of the apparatus recourse must be had to the model
thereof which is herewith transmitted. The apparatus is to be applied
by placing the back pad upon the spine just above its junction
with the hip bones; and the belly pad as aforesaid upon the entire
lower part of the front surface of the belly, the spring embracing
the body closely from one pad to the other, in the same manner
as it does in the trusses now in use. In some cases, it is ne-
cessary to have the inner surface of the belly pad very soft and
yielding on account of the great sensibility of the belly. For this
purpose a sack is made of india rubber cloth, or other material
impervious to air, and inflated with air; it should be about one
inch thick when inflated, and about one inch larger in super
ficial extent than the belly pad of the apparatus. This cushion
or [illegible] of air as is worn next the belly of the patient under
the belly pad. See the model of the air pad.
In certain instances in which there is great relaxation of
that part of the belly known in anatomy by the term Perineum
it is necessary to have pressure made upon that part. This is
effected by conveying a strap of convenient size and material
from one pad to the other, under the bottom of the belly of the
patient patient between the thighs. This strap is attached to the pads by means of brass buttons, or knobs which are fixed for that purpose to the backs of the pads. The strap can be made to press more or less tightly, that is can be shortened or lengthened, by means of button holes near the ends of it. In order to render the pressure useful a cushion must be placed against the perineum, over which the strap is drawn. The best cushion for this purpose is made in the same manner as the air sack above described; it must however correspond in size and shape to the size and shape of the perineum. In some cases it is necessary to make a coun-ter pressure to this strap to prevent it from dragging the pads of the apparatus out of place. In these cases a pair of straps are carried over the shoulders from one pad to the other, these straps are fastened to the pads by the same means as the strap last described. Finally in some cases it may be advisable to make a very much stronger pressure than can be conveniently made by the spring above, when a strap can be carried from one pad to the other around the body on the side opposite to the spring so as to form a complete circle around the body. This strap is fastened to the pads as the foregoing straps are. For the better understanding of the operation, and fixture of these straps reference must be had to the Model of the apparatus.

Exd Witnesses                                        Amos G. Hull.
W.L. N. Edson Sheldon.
Henry S. Paine.

Drawing 1808 words.